(12) United States Patent
Suarez et al.

(10) Patent No.: US 11,089,884 B1
(45) Date of Patent: Aug. 17, 2021

(54) FISHING REEL STORAGE AND DISPLAY SYSTEM

(71) Applicants: Omar F. Suarez, Cliffside Park, NJ (US); Justin Suarez, Cliffside Park, NJ (US)

(72) Inventors: Omar F. Suarez, Cliffside Park, NJ (US); Justin Suarez, Cliffside Park, NJ (US)

( * ) Notice: Subject to any disclaimer, the term of this patent is extended or adjusted under 35 U.S.C. 154(b) by 0 days.

(21) Appl. No.: 17/021,455

(22) Filed: Sep. 15, 2020

(51) Int. Cl.
  *A47F 5/08* (2006.01)
  *A47F 7/00* (2006.01)
  *F16B 2/12* (2006.01)
  *A01K 89/00* (2006.01)

(52) U.S. Cl.
  CPC ............ *A47F 5/0807* (2013.01); *A47F 7/005* (2013.01); *F16B 2/12* (2013.01); *A01K 89/00* (2013.01)

(58) Field of Classification Search
  CPC .......... A47F 5/0807; A47F 7/005; A47F 7/00; A47F 5/10; F16B 2/12; F16B 2/065; A01K 89/00; A01K 89/06
  See application file for complete search history.

(56) References Cited

U.S. PATENT DOCUMENTS

| | | | | |
|---|---|---|---|---|
| 1,339,238 A | * | 5/1920 | Tillman ................. | A01K 87/06 43/22 |
| 1,780,872 A | | 11/1930 | Dumben | |
| 3,282,519 A | * | 11/1966 | Rheinstrom ........... | A47K 10/38 242/596.8 |
| 3,433,446 A | * | 3/1969 | Meder ...................... | A47F 7/00 248/316.3 |
| 3,461,594 A | * | 8/1969 | Ohmura ................. | A01K 87/06 43/22 |
| 3,463,430 A | * | 8/1969 | Jimenez ................ | F41G 11/003 42/124 |
| 4,458,874 A | | 7/1984 | Rabas et al. | |
| 4,554,755 A | * | 11/1985 | Hsu ........................ | A01K 87/06 43/22 |
| 4,677,780 A | | 7/1987 | Shuman | |
| 6,138,840 A | | 10/2000 | Seip | |

(Continued)

*Primary Examiner* — Ko H Chan
(74) *Attorney, Agent, or Firm* — Thomas J. Germinario

(57) ABSTRACT

An apparatus for storing and/or displaying multiple fishing reels using the reel foot of each reel to removably attach it to a reel rack. The reel rack has a generally rectangular, oblong configuration. At least one of the rack sides comprises a lateral rail defined by multiple continuous uniformly spaced rail ridges separated by intervening rail slots. Slidably attached to the rack top are at least two paired foot clamps, each of which supports a foot socket that is configured to hold one tapered end of a reel foot. Each foot clamp has two clamp arms, each of which extends downward from the base of the foot clamp and engages one of the rack sides. At least one of the clamp arms contains a spring-loaded plunger which engages the lateral rail and releasably projects into at least one of the rail slots, so as to secure the foot clamp in a fixed position along the lateral rail until the plunger is manually released. Each of the mated pairs of foot sockets are slidably positionable along the reel rack to cooperatively engage and enclose two tapered ends of the reel foot through the respective socket apertures, thereby releasably and adjustably secure the fishing reel to the reel rack for purposes of display and storage.

2 Claims, 9 Drawing Sheets

(56) References Cited

U.S. PATENT DOCUMENTS

| | | | |
|---|---|---|---|
| 9,459,078 B1 | 10/2016 | Kincel | |
| 9,671,198 B2 | 6/2017 | Bartoszewicz | |
| 10,231,558 B1 * | 3/2019 | Suarez | A47F 7/00 |
| 2019/0390692 A1 * | 12/2019 | Li | F16B 2/12 |

* cited by examiner

FISHING REEL STORAGE AND DISPLAY SYSTEM

FIELD OF INVENTION

The present invention pertains to the field of fishing equipment, and more particularly to systems for storing and displaying fishing equipment.

BACKGROUND OF THE INVENTION

A variety of different fishing reels of different sizes and configurations are used for different fishing environments and species. Storage and display of fishing reels for use and sale can be facilitated by a rack system to which the reels can readily be attached and removed. Since all fishing reels have reel foot which is inserted into the reel seat of a fishing rod, it makes sense to use the reel foot in connecting the reel to a storage/display rack. Since fishing reels have a range of widths, weights and separations between the reel foot and the reel itself, an effective rack system needs to be scalable to accommodate various types of reels. Moreover, the rack system should be adaptable for mounting in either a horizontal or a vertical orientation, depending on the configuration of the available support structures.

SUMMARY OF THE INVENTION

The present invention is an apparatus for storing and/or displaying multiple fishing reels by using the reel foot of each reel to removably attach it to a reel rack. The reel rack has a generally rectangular, oblong configuration. At least one of the rack sides comprises a lateral rail defined by multiple continuous uniformly spaced rail ridges separated by intervening rail slots.

Slidably attached to the rack top are at least two paired foot clamps, each of which supports a foot socket that is configured to hold one tapered end of a reel foot. Therefore, in a mated pair of foot clamps, one has a proximal-opening socket aperture, and the other has a distal-opening socket aperture. Each foot clamp has two clamp arms, each of which extends downward from the base of the foot clamp and engages one of the rack sides. At least one of the clamp arms contains a spring-loaded plunger which engages the lateral rail and releasably projects into at least one of the rail slots, so as to secure the foot clamp in a fixed position along the lateral rail until the plunger is manually released.

Each of the mated pairs of foot sockets are slidably positionable along the reel rack to cooperatively engage and enclose two tapered ends of the reel foot through the respective socket apertures, thereby releasably and adjustably secure the fishing reel to the reel rack for purposes of display and storage.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
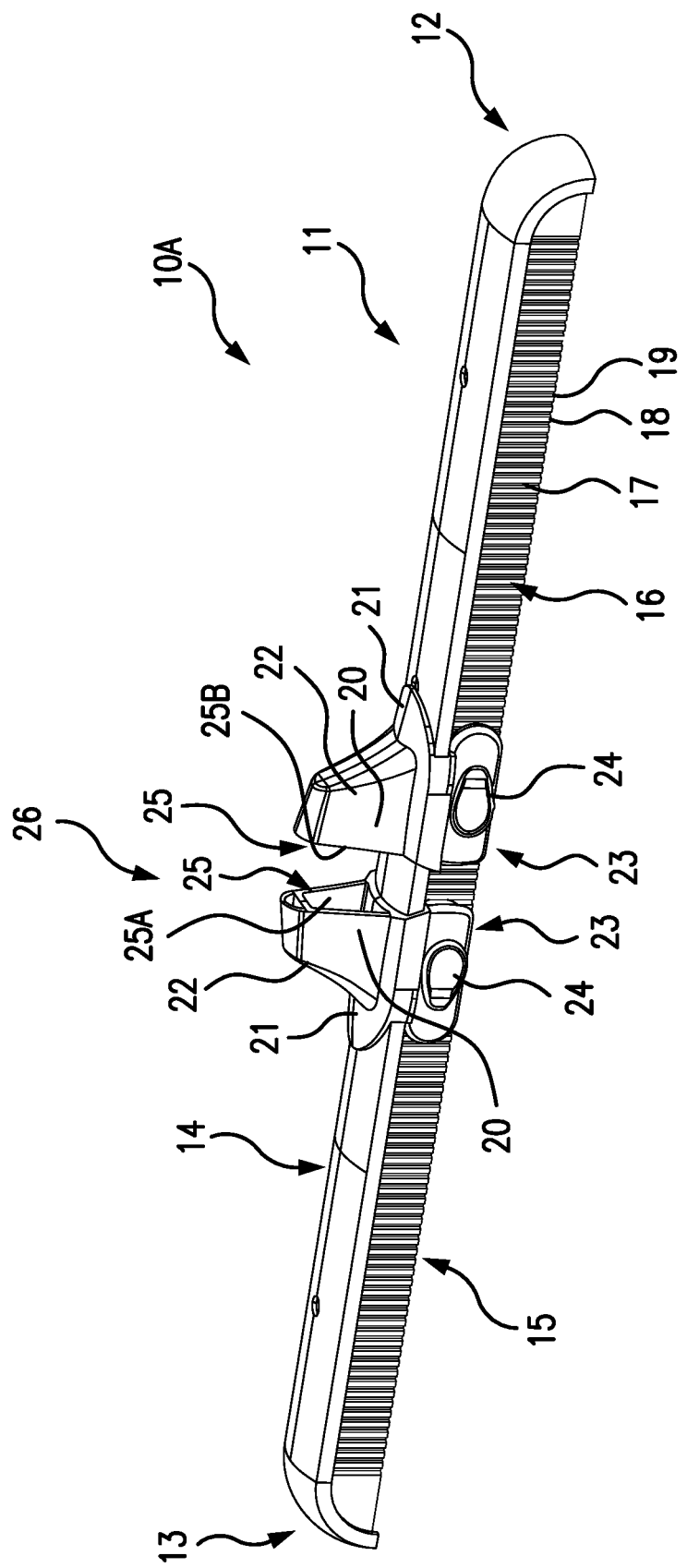
FIG. 1 is a front perspective view of the first embodiment of the present invention.
Figure 2:
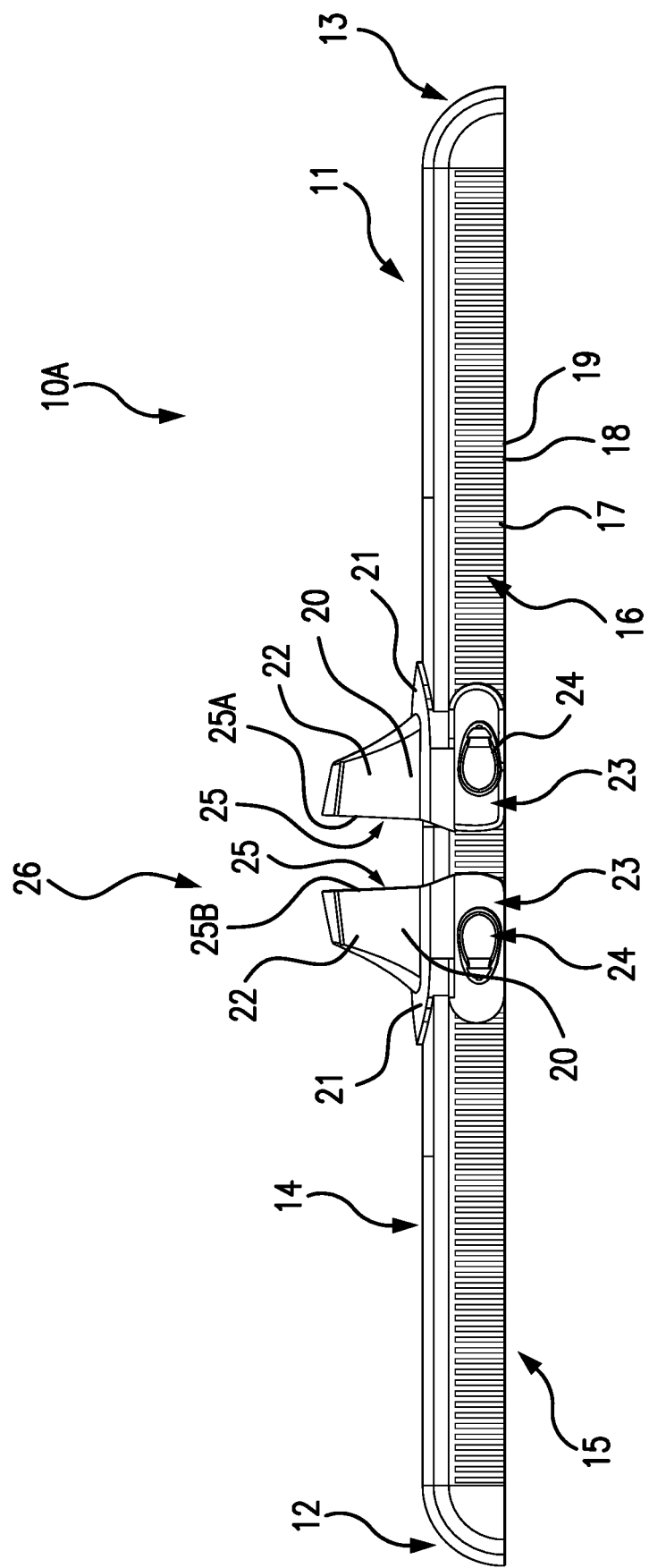
FIG. 2 is a rear profile view of the first embodiment of the present invention.
Figure 3:
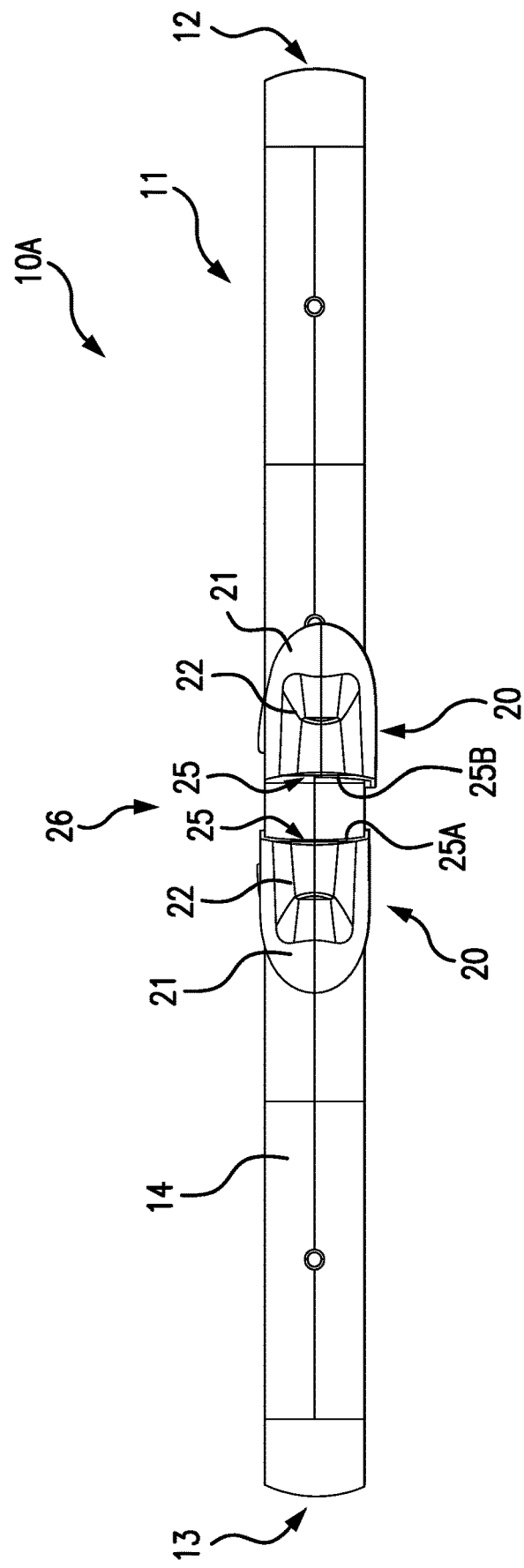
FIG. 3 is a top plan view of the first embodiment of the present invention.
Figure 4:
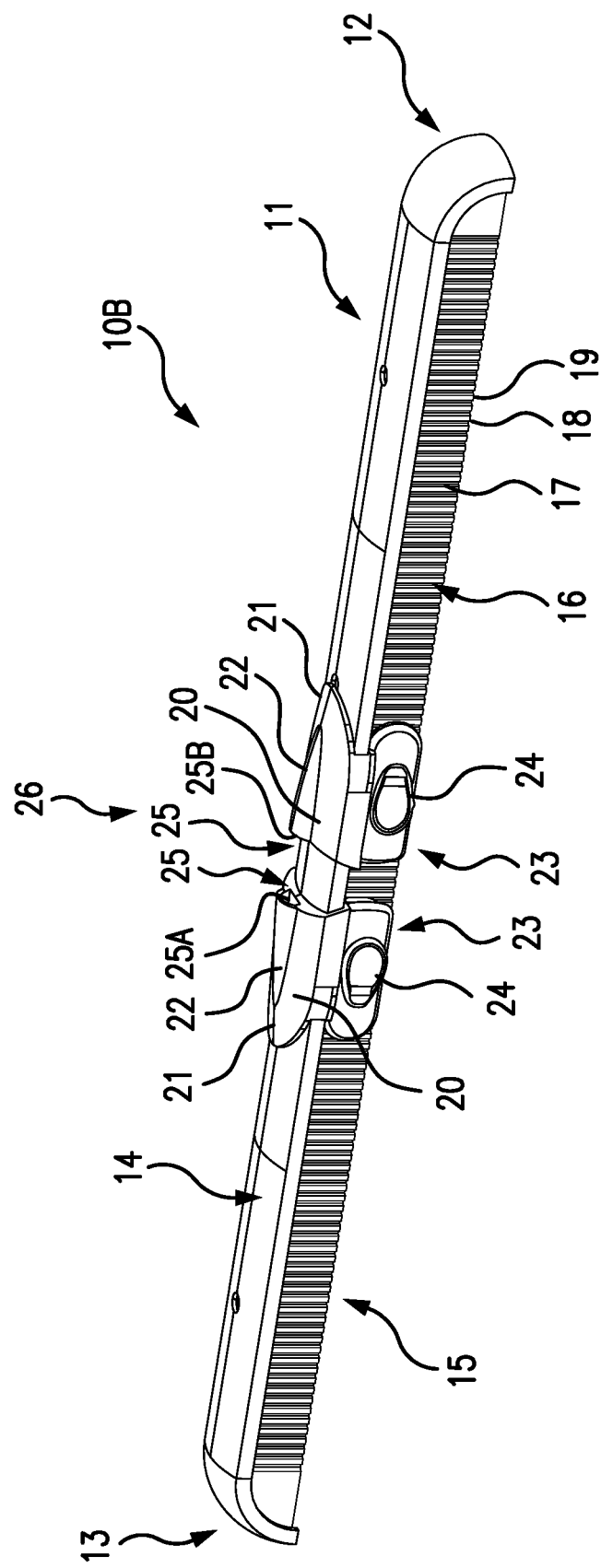
FIG. 4 is a front perspective view of the second embodiment of the present invention.
Figure 5:
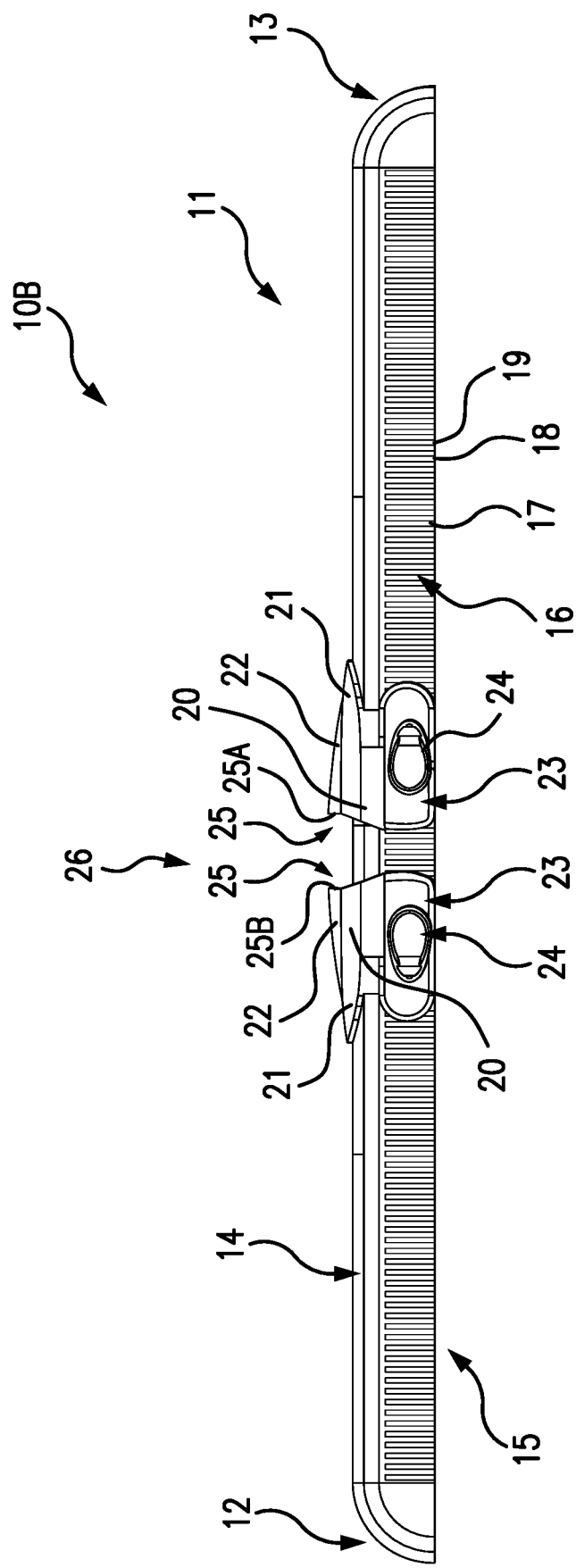
FIG. 5 is a rear profile view of the second embodiment of the present invention.
Figure 6:
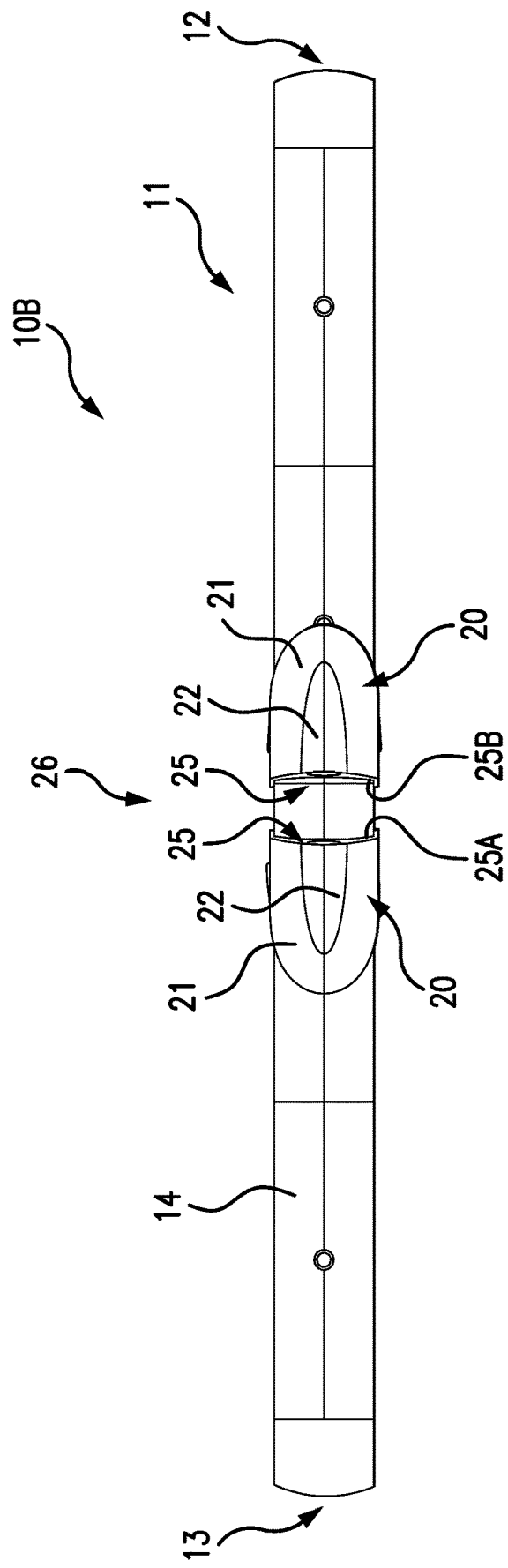
FIG. 6 is a top plan view of the second embodiment of the present invention.

FIGS. 1-3 depict an exemplary first embodiment 10A of the present invention, while FIGS. 4-8 depict an exemplary second embodiment 10B of the present invention. The reel rack 11 has a proximal end 12 and a distal end 13. The rack top 14 is slightly convex shaped, and the two rack sides 16 extend vertically perpendicularly downward from the rack top. Each of the rack sides comprise a lateral rail 17 defined by multiple uniformly spaced rail ridges 18 separated by intervening rail slots 19.

Figure 9:
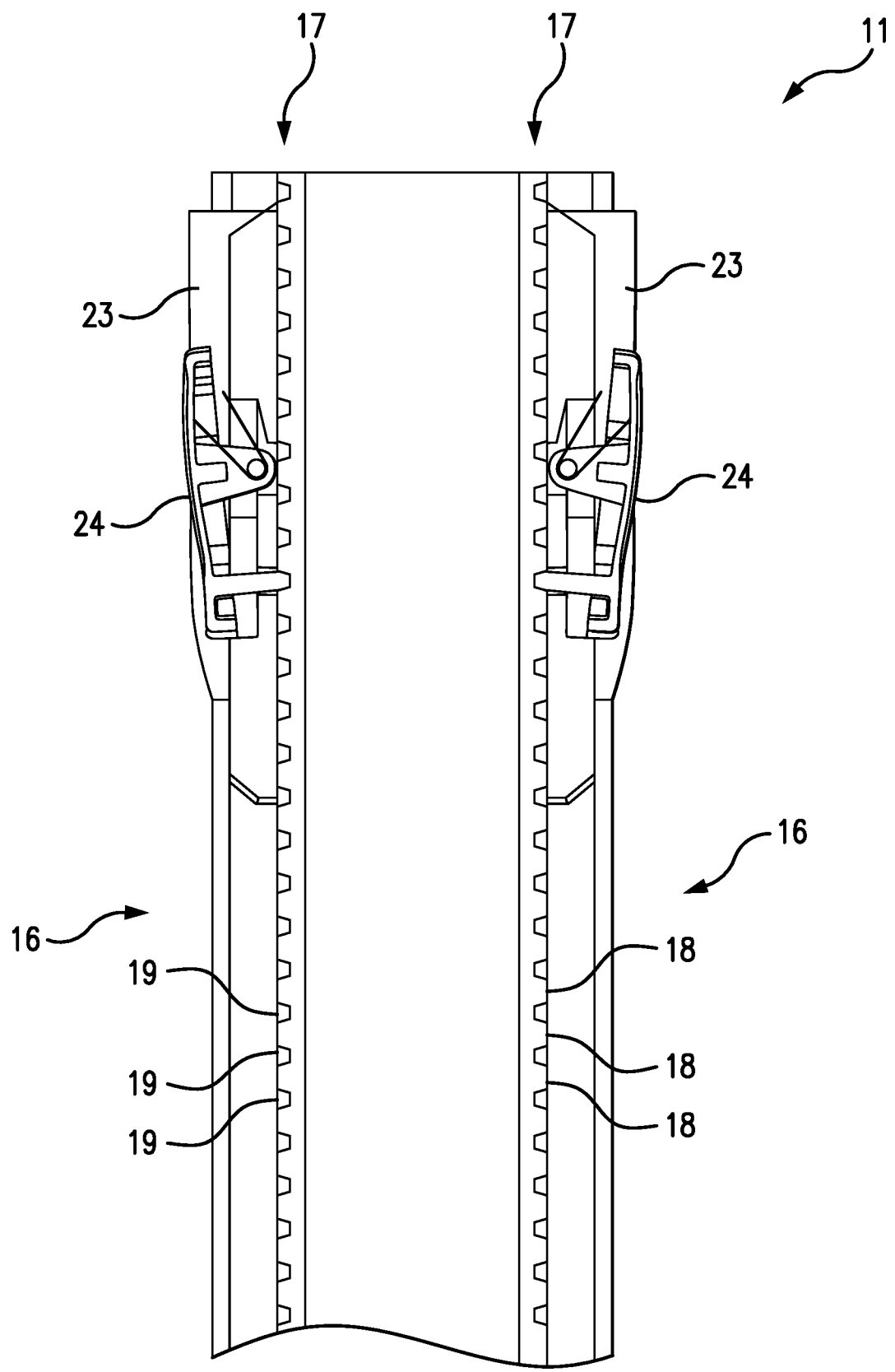
FIG. 9 is a detail view of an exemplary spring-loaded plunger.

Two cooperating foot clamps 20 slidably engage the rack top 14. The foot clamps 20 each have two clamp arms 23, which extend downward from the clamp base 21 and slidably engage one of the rack sides 16. Each of the clamp arms 23 contains a spring-loaded plunger 24, depicted in FIG. 9, which releasably projects into one of the rail slots 19, so as to secure the foot clamp 20 in a fixed position along the lateral rail 17 until the plunger 24 is manually released. Each of the foot clamps 20 has a clamp base 21, which supports a foot socket 22, which is configured to receive and enclose one of the tapered ends of the reel foot 27 within a socket aperture 25.

Figure 8:
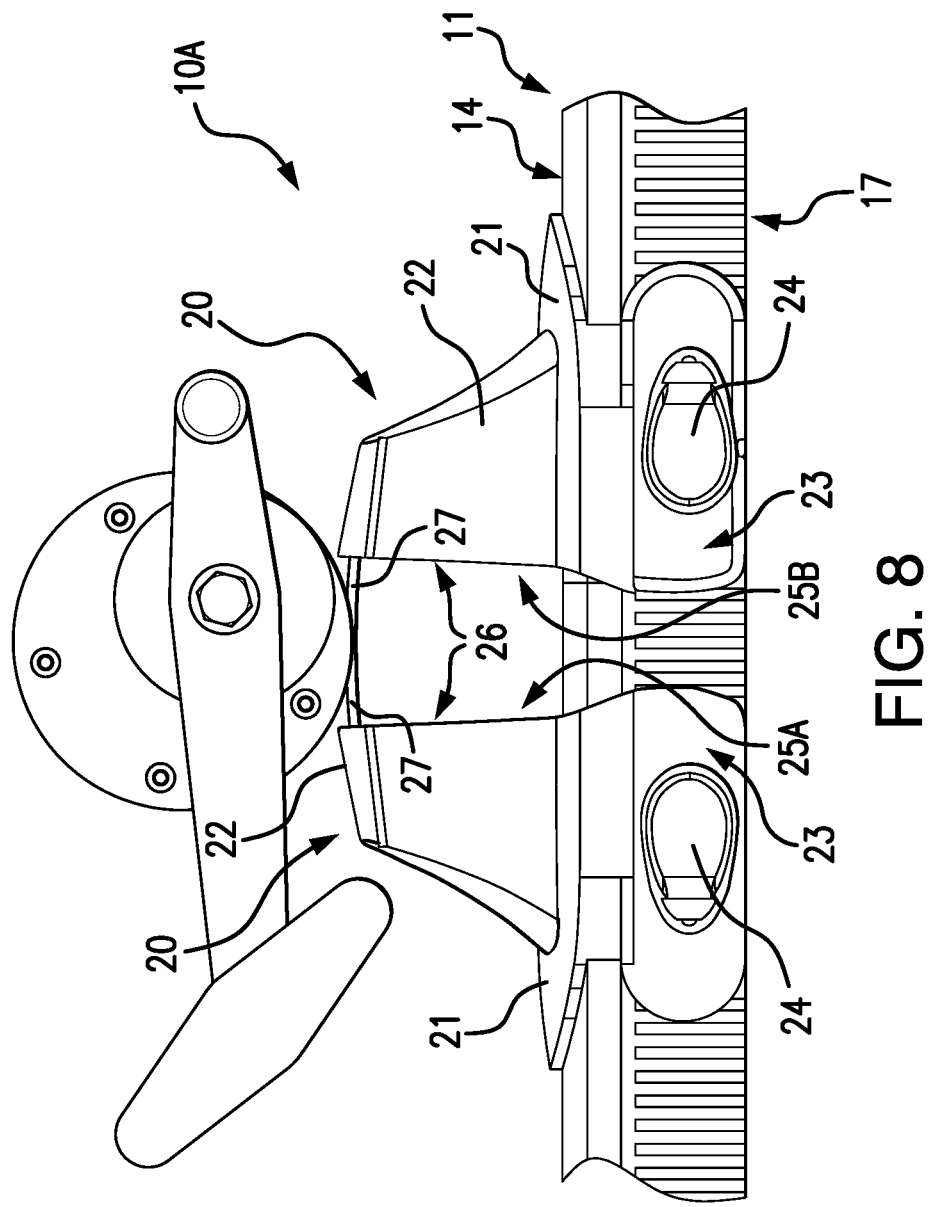
FIG. 8 is a partial front perspective view of the first embodiment of the present invention displaying a fishing reel.

In the mated pair of foot clamps 26, the foot sockets are opposite facing, such that one has a proximal-opening socket aperture 25A and one has a distal-opening socket aperture 25B. As best seen in FIG. 8, each mated pair 26 of foot sockets 22 are slidably positionable along the reel rack 11 to cooperatively receive and enclose the two tapered ends of the reel foot 27 through the socket apertures 25, thereby releasably and adjustably securing the fishing reel to the reel rack 11 for purposes of display and storage.

Figure 7:
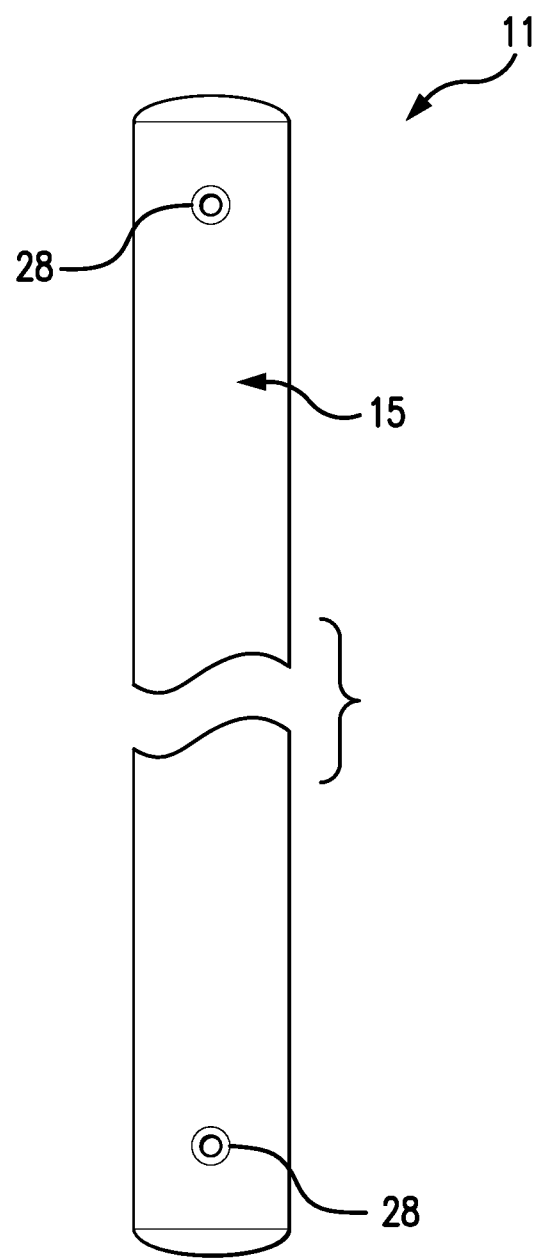
FIG. 7 is a bottom plan view of the second embodiment of the present invention with a rack attachment means.

Optionally, as shown in FIG. 7, the rack base can contain a rack attachment means 28, such as the counter-sunk screw holes depicted, by which the reel rack 11 can be either vertically or horizontally secured to a supporting structure, such as a wall or counter top.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. An apparatus for storing and displaying one or more fishing reels, each of which has a reel foot, the apparatus comprising:

an oblong reel rack, having a substantially rectangular cuboidal shape and having a convex rack top, a rack base and two rack sides, and having a proximal end and a distal end, wherein at least one of the rack sides comprises a lateral rail defined by multiple continuous uniformly spaced vertical rail ridges separated by intervening vertical rail slots;

at least two foot clamps, wherein each foot clamp comprises a concave clamp base, which slidably engages the rack top and which supports a foot socket, and two clamp arms, each of which extends downward from the clamp base and slidably engages one of the rack sides, wherein at least one of the clamp arms contains a spring-loaded plunger which releasably projects into at least one of the rail slots, so as to secure the foot clamp in a fixed position on the lateral rail until the plunger is manually released;

wherein each of the foot sockets has a socket aperture, which is either a proximal-opening socket aperture or a distal-opening socket aperture, and wherein the foot sockets are cooperatively paired together, such that each of the proximal-opening socket apertures faces one of the distal-opening socket apertures, so as to constitute a mated pair of foot sockets; and wherein in each mated pair of foot sockets, the foot sockets are slidably positionable along the reel rack to cooperatively engage and enclose two tapered ends of the reel foot through the socket apertures and within the foot sockets, thereby releasably and adjustably securing the fishing reel to the reel rack for purposes of display and storage.

2. The apparatus according to claim 1, wherein the rack base contains a rack attachment means by which the reel rack is securable to a supporting structure.

\* \* \* \* \*